United States Patent
Shibata

(10) Patent No.: US 7,048,252 B2
(45) Date of Patent: May 23, 2006

(54) FLUID CONTROL APPARATUS

(75) Inventor: Takayuki Shibata, Nagoya (JP)

(73) Assignee: Advics Co., Ltd., Aichi-pref (JP)

( * ) Notice: Subject to any disclaimer, the term of this patent is extended or adjusted under 35 U.S.C. 154(b) by 77 days.

(21) Appl. No.: 10/862,343

(22) Filed: Jun. 8, 2004

(65) Prior Publication Data
US 2004/0262559 A1 Dec. 30, 2004

(30) Foreign Application Priority Data
Jun. 25, 2003 (JP) .............................. 2003-180935

(51) Int. Cl.
*F16K 31/06* (2006.01)
(52) U.S. Cl. ................................. 251/129.15
(58) Field of Classification Search ............ 251/129.15
See application file for complete search history.

(56) References Cited

U.S. PATENT DOCUMENTS

| | | | |
|---|---|---|---|
| 4,251,052 A * | 2/1981 | Hertfelder et al. ..... | 251/129.02 |
| 5,160,116 A * | 11/1992 | Sugiura et al. ........ | 251/129.14 |
| 5,845,672 A | 12/1998 | Reuter et al. | |
| 5,887,798 A * | 3/1999 | Ohta et al. ............... | 239/585.1 |
| 6,293,634 B1 | 9/2001 | Hosoya | |
| 6,719,268 B1 * | 4/2004 | Fukano et al. ......... | 251/129.17 |
| 2002/0092998 A1 | 7/2002 | Torii et al. | |

FOREIGN PATENT DOCUMENTS

DE 698 09 501 T2 9/2003

\* cited by examiner

*Primary Examiner*—J. Casimer Jacyna
(74) *Attorney, Agent, or Firm*—Posz Law Group, PLC

(57) ABSTRACT

An elastic member made of rubber which urges a coil portion toward a cover is formed into a shape such that the elastic member can be deformed by bending. A rate of change in reaction force of the elastic member with respect to an amount of deformation in a bending deformation region is less than a case where the elastic member is subject to compressive deformation. Therefore, even in the case where the amount of deformation of the elastic member increases due to dimensional variation of a component part, the reaction force of the elastic member does not become excessively large.

3 Claims, 6 Drawing Sheets

FLUID CONTROL APPARATUS

CROSS REFERENCE TO RELATED APPLICATION

This application is based upon and claims the benefit of Japanese Patent Application No. 2003-180935 filed on Jun. 25, 2003, the content of which are incorporated herein by reference.

FIELD OF THE INVENTION

The present invention relates to a fluid control apparatus which opens and closes a fluid passage using a solenoid valve. For example, the present invention is preferably applied to an ABS actuator of an anti-lock brake system (ABS) in a vehicle for avoiding a locking of wheels by increasing and decreasing a brake fluid pressure.

BACKGROUND OF THE INVENTION

In a conventional ABS actuator, a fluid passage formed in a housing is opened and closed by a solenoid valve. Further, a coil portion of a solenoid valve is sandwiched between the housing and the cover, and the coil portion is pressed to a cover by an elastic member disposed between the coil portion and the housing (for example, as disclosed in Japanese Patent Laid-Open Application No. 11-43031) so as to avoid looseness of the coil portion.

However, force for pressing the coil portion to the cover is reaction force generated by compressive deformation of the elastic member, and the reaction force largely varies in accordance with an amount of deformation. Further, when a dimensional variation of a component part is taken into consideration, the amount of deformation of the elastic member also greatly varies, and thus it is necessary to assume that very large reaction force is applied in terms of a design. Therefore, it becomes necessary to increase rigidity of the coil portion and the cover so as not to deform or destroy them, or it is necessary to increase strength by using a larger screw for connecting the cover with the housing. This caused increase in the cost and the size of the ABS actuator.

SUMMARY OF THE INVENTION

In light of the above described problems, it is an object of the present invention to reduce a cost and a size of a fluid control apparatus while inhibiting reaction force of an elastic member that presses a coil portion to a cover from becoming excessively large.

According to an aspect of the present invention, a rate of change of reaction force with respect to an amount of deformation in a bending deformation range of an elastic member is less than a case where the elastic member is subject to compressive deformation. Therefore, even in the case where the amount of deformation of the elastic member increases due to dimensional variation of a component part, the reaction force of the elastic member pressing the coil portion to the cover does not become excessively large. Accordingly, it is possible to reduce a cost and a size of the fluid control apparatus.

According to a preferred form of the aspect of the present invention, a lip portion in a free state inclines toward a center line of the elastic member. If the lip portion in the free state is in parallel with the center line of the elastic member, the lip portion might be subject to compressive deformation when the elastic member is assembled. However, according to the present invention, by disposing the lip portion such that it inclines toward the center line of the elastic member in the free state, the lip portion can be reliably deformed by bending when the elastic member is assembled.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
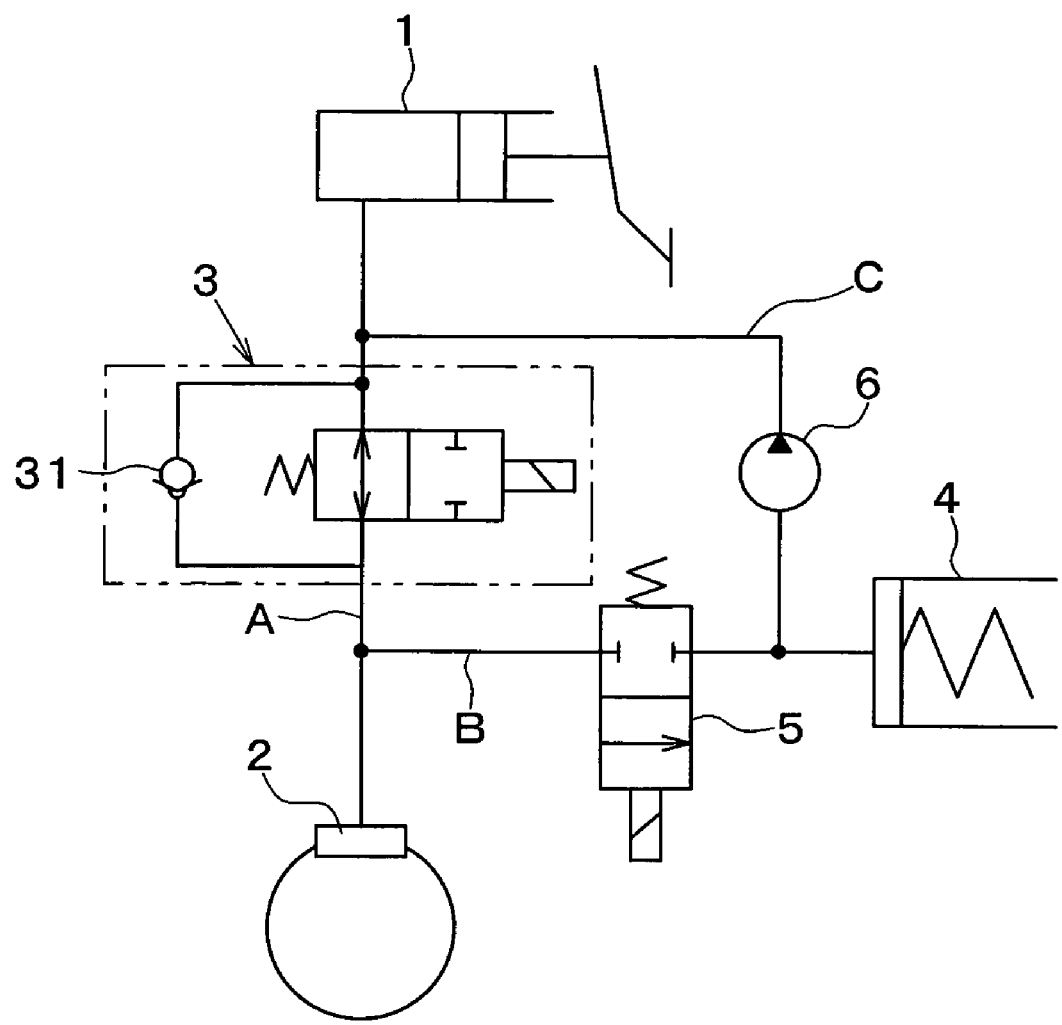
FIG. 1 shows a brake conduit configuration of a brake apparatus including an ABS actuator of a first embodiment of the present invention.

The present invention will be described further with reference to various embodiments in the drawings.

(First Embodiment)

FIG. 1 shows a brake conduit configuration of a brake apparatus including an ABS actuator as a fluid control apparatus according to a first embodiment of the present invention.

As shown in FIG. 1, a master cylinder 1 is connected to a wheel cylinder 2 through a brake conduit A. The brake conduit A allows brake fluid to flow from a side of the master cylinder 1 to a side of the wheel cylinder 2 through the brake conduit A. A pressure increase control valve 3 is provided in the brake conduit A for controlling communicated and closed states of the brake conduit A. Note that the pressure increase control valve 3 includes a check valve 31 which permits the brake fluid to flow only from the side of the wheel cylinder 2 to the side of the master cylinder 1. The pressure increase control valve 3 corresponds to a solenoid valve according to the present invention, and a detailed explanation thereof will be described later.

A portion of the brake conduit A on the side of the wheel cylinder 2 (i.e. downstream) of the pressure increase control valve 3 is connected to a brake conduit B which is connected to a reservoir 4. A pressure reduction control valve 5 is provided in the brake conduit B for controlling communicated and closed states of the brake conduit B. The pressure reduction control valve 5 is closed when normal braking is executed. During a pressure is reduced by an ABS control, the pressure reduction control valve 5 is communicated so as to release the brake fluid in the brake conduit A to the reservoir 4, thereby being actuated for reducing the wheel cylinder pressure.

Further, a portion on the side of the master cylinder 1 (i.e. upstream) of the pressure increase control valve 3 in the brake conduit A is connected to the reservoir 4 through a brake conduit C. The brake conduit C is provided with a pump 6 for sucking in and discharging the brake fluid which is released to the reservoir 4 so as to return the brake fluid to the brake conduit A.

Figure 2:
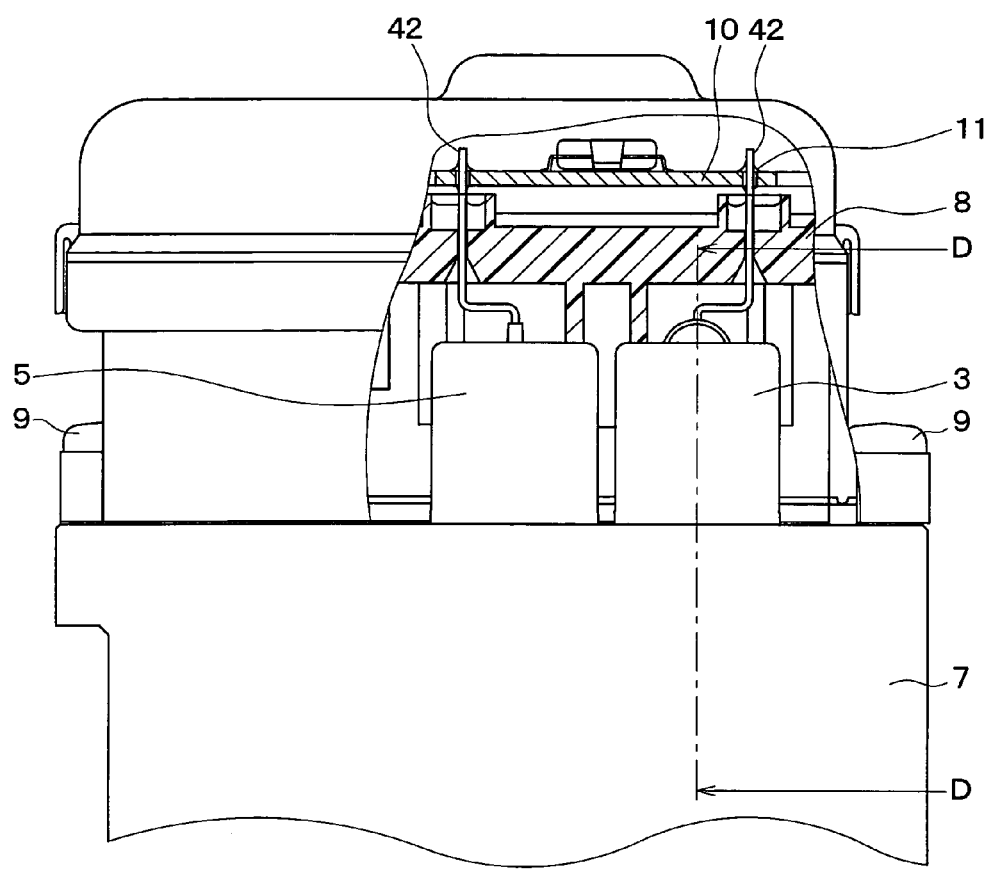
FIG. 2 is a partial sectional view of the ABS actuator according to the first embodiment.

FIG. 2 shows a partial cross section showing a structure of an ABS actuator. In FIG. 2, the reservoir 4 (see FIG. 1) and a pump 6 (see FIG. 1) are housed in an aluminum housing 7. The pressure increase control valve 3 and the pressure reduction control valve 5 are disposed in line on one of side faces of the housing 7. A resin cover 8 is fixed to the housing 7 with a screw 9, whereby the pressure increase control valve 3 and the pressure reduction control valve 5 are sandwiched by the housing 7 and the cover 8. A terminal 42 pulled out from coils of the pressure increase control valve 3 and the pressure reduction control valve 5 is soldered to a bus bar 10 in the cover 8 through a soldered portion 11.

The cover 8 has an upper portion for housing the bas bar 10 and a motor drive circuit, and a lower portion for housing the solenoid valve. The upper portion and the lower portion are integrally formed by resin.

Figure 3:
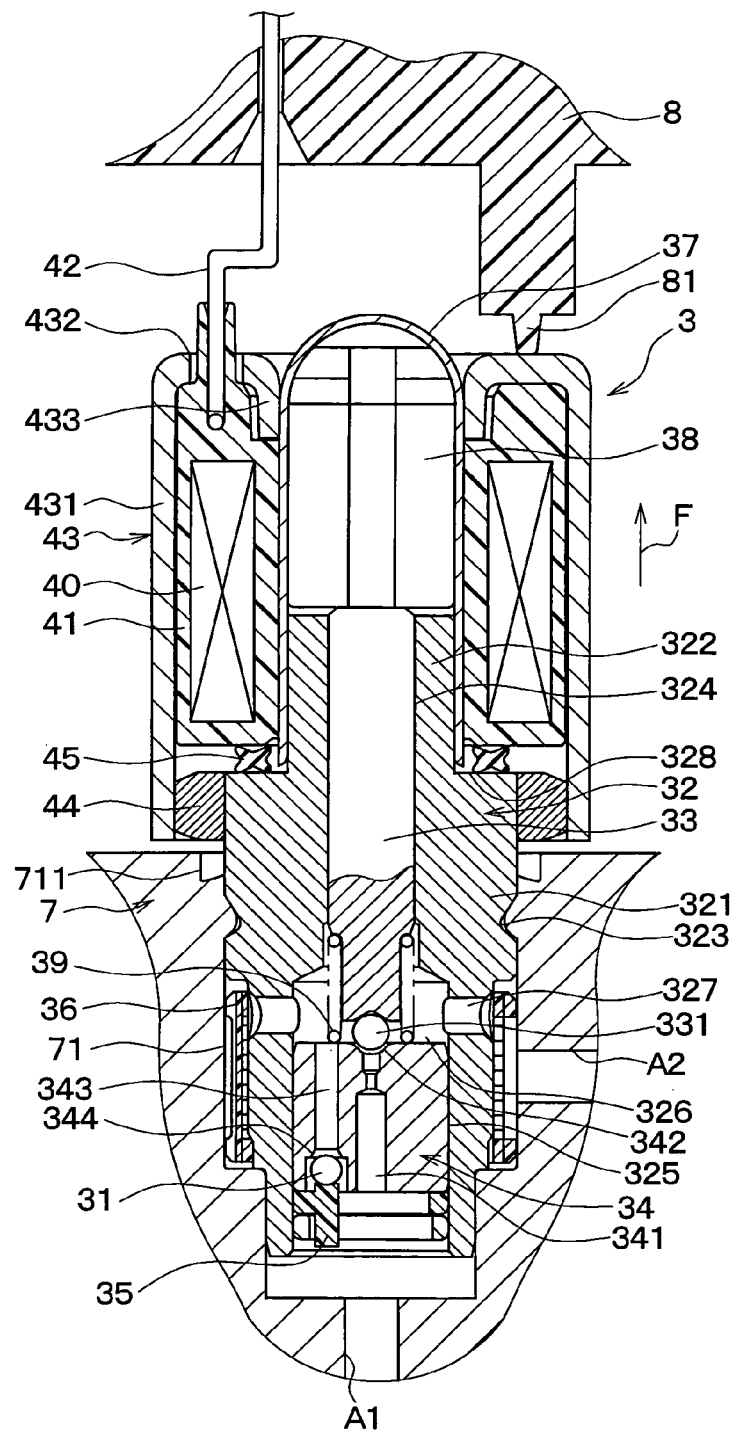
FIG. 3 is a sectional view of a structure of a pressure increase control valve taken along line D-D of FIG. 2.
Figure 4:
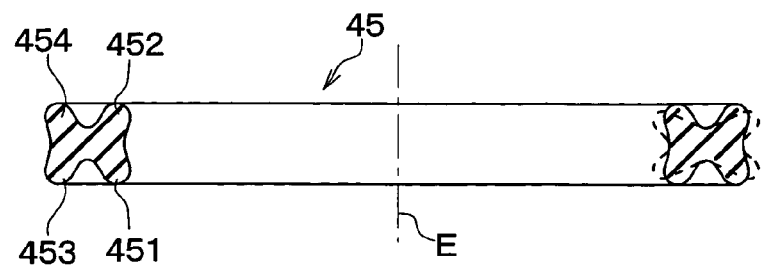
FIG. 4 is a sectional view of a structure of an elastic member in FIG. 3.

FIG. 3 is a cross section taken along line D—D of FIG. 2 showing a structure of the cross section when the pressure increase control valve 3 is disposed in the housing 7 of the ABS actuator. Further, FIG. 4 shows a structure of an elastic member 45 in the pressure increase control valve 3. Hereinafter, a structure of the pressure increase control valve 3 will be explained based on FIGS. 3 and 4.

In FIG. 3, a recess portion 71 which is used for assembly of the pressure increase control valve 3 is formed in the housing 7. The recess portion 71 is communicated with the brake conduit A provided in the housing 7. A brake conduit A1 upstream of the pressure increase control valve 3 is connected to the master cylinder 1 and a brake conduit A2 downstream thereof is connected to the wheel cylinder 2. Note that the brake conduit A1 and the brake conduit A2 correspond to a fluid passage of the present invention.

The pressure increase control valve 3 is provided with a guide 32 which is formed of a magnetic material and which constitutes a magnetic path. The guide 32 is formed in a stepped columnar shape, a side of a large diameter portion 321 of the guide 32 is fitted into the recess portion 71 of the housing 7. Further, part of the large diameter portion 321 and a small diameter portion 322 of the guide 32 project to the outside of the recess portion 71. Further, a part of the housing 7 enters a dent 323 of an outer peripheral surface of the large diameter portion 321 by caulking an opening end portion 711 of the recess portion 71, whereby the guide 32 is fixed to the housing 7.

The guide 32 is formed with a guide hole 324 which is positioned at a side of the small diameter portion 322 for holding a shaft 33 so as to be slidable, a seat insertion hole 325 which is positioned on the side of the large diameter portion 321 into which a seat 34 is pressed, and a communication hole 327 which communicates the brake conduit A2 with a space 326 surrounded by the seat 34 and the seat insertion hole 325.

The columnar shaft 33 is made of a non-magnetic metal (such as stainless steel), and an end portion on a side of the seat 34 extends to the space 326 by protruding from the guide hole 324 of the guide 32. Further, a spherical valve element 331 is welded to a distal end of the shaft 33.

The cylindrical seat 34 is formed with a first communication passage 341 at a central portion in the radial direction thereof, for communicating the space 326 in the guide 32 with the brake conduit A1. A tapered first valve seat 342 which the valve element 331 of the shaft 33 contacts and separates from is formed at an end portion on a side of the space 326 in the first communication passage 341.

Further, a second communication passage 343 is formed in parallel with the first communication passage 341 for communicating the space 326 in the guide 32 with the brake conduit A1 in the seat 34. A tapered second valve seat 344 which a spherical check valve 31 contacts and separates from is formed at an end portion on a side of the brake conduit A1 in the second communication passage 343.

The check valve 31 is retained by a filter 35 which is pressed in a side of an end portion of the seat insertion hole 325 of the guide 32 at a position facing the second valve seat 344. Moreover, a filter 36 is disposed so as to surround the communication hole 327 also on an outer periphery of the large diameter portion 321 of the guide 32. These filters 35 and 36 prevent a foreign matter that contaminated the brake fluid from entering the pressure increase control valve 3.

A sleeve 37 is fitted in the outer peripheral side of the small diameter portion 322 of the guide 32. The sleeve 37 is made of non-magnetic metal (such as stainless steel) and has a cup-like shape with one end thereof is opened, and a bottomed surface thereof is generally spherical.

Moreover, a generally cylindrical plunger 38 made of a magnetic material is disposed on a side of the bottom surface of the sleeve 37, and the plunger 38 is slidable in the sleeve 37. Note that the plunger 38 contacts the bottom surface of the sleeve 37, and when it contacts the bottom surface of the sleeve 37, sliding of the plunger 38 in the upward direction as shown in the drawing is restricted.

The shaft 33 is urged to a side of the plunger 38 by a spring 39 which is disposed between the shaft 33 and the seat 34. The shaft 33 always abuts with the plunger 38 so as to be operable integrally. Note that the shaft 33 and the plunger 38 constitute a movable member which moves in accordance with application or non-application of current to a coil to be described later.

A cylindrical spool 41 is disposed around the sleeve 37, which houses a coil 40 which creates a magnetic field when current is applied. This spool 41 made of resin (such as nylon) is formed by attaching the coil 40 thereto after a primary molding and by subsequent secondary molding.

A terminal 42, which is pulled out from the coil 40, is soldered to a bus bar 10 (see FIG. 2). This enables current application to the coil 40 through the terminal 42.

Further, a yoke 43 made of a magnetic material is disposed on the outer periphery of the spool 41. The yoke 43 has a generally cup-like shape having an outer cylindrical portion 431, a flange portion 432 which extends in a radially inward direction from the end portion on a side of the cover 8 of the outer cylindrical portion 431, and an inner cylindrical portion 433 which extends from an inner peripheral portion of the flange portion 432 toward the side of the housing 7 in the axial direction. Thus, the spool 41, the sleeve 37 and the like are able to be housed through an opening portion on the side of the housing 7 of the outer cylindrical portion 431.

A ring member 44 made of a magnetic material is pressed in the inner peripheral surface of the opening on the side of the housing 7 of the outer cylindrical portion 431. The ring member 44 is disposed so as to surround the large diameter portion 321 of the guide 32.

The spool 41 is loosely fitted into the yoke 43 so as to be capable of mutually relative movement. Moreover, the spool 41, the yoke 43, and the ring member 44 are loosely fitted into the guide 32 and the sleeve 37 so as to be capable of mutually relative movement. Note that the coil 40, the spool 41, the yoke 43 and the ring member 44 constitute the coil portion according to the present invention. The coil 40 and the yoke 43 constitute a main portion of the coil portion.

The elastic member 45 formed of silicon rubber or the like into a ring-like shape is disposed at the end face on the side of the housing 7 of the coil portion, for more detail, between the spool 41 and the guide 32. Further, the elastic member 45 is disposed in the end face on the side of the housing 7 of the coil portion such that a direction of a center line E (see FIG. 4) of the elastic member 45 is in alignment with a direction F in which the elastic member 45 urges the coil portion.

The cover 8 is formed with a plurality of projecting portions 81 which project toward a side of the flange portion 432 of the yoke 43. Further, in a state where the pressure increase control valve 3 is sandwiched by the housing 7 and the cover 8, the spool 41 is pressed to the flange portion 432 of the yoke 43 by reaction force of the elastic member 45, and the yoke 43 is pressed to a projecting portion 81 of the cover 8 through the spool 41. Accordingly, it is possible to prevent looseness of both the spool 41 and the yoke 43, whereby a mechanical load acting on the terminal 42 and the soldered portion 11 (see FIG. 2) is suppressed.

Next, a detailed structure of the elastic member 45 will be explained with reference to FIG. 4. FIG. 4 shows a face of the elastic member 45 when cross sectionally cut, perpendicular to the circumferential direction of the elastic member 45. Further, a solid line in FIG. 4 shows a shape of the elastic member 45 when it is in a free state, and a dotted line in FIG. 4 shows a shape of the elastic member 45 when it is assembled at a predetermined position as shown in FIG. 3.

In FIG. 4, the elastic member 45 has four lip portions 451 to 454 that can be deformed by bending. They are a first inner peripheral lip portion 451 located on the inner peripheral side in the radial direction of the elastic member 45 and on one end side in the direction of the center line E; a second inner peripheral lip portion 452 located on the inner peripheral side in the radial direction of the elastic member 45 and on the other end side in the direction of the center line E; a first outer peripheral lip portion 453 located on the outer peripheral side in the radial direction of the elastic member 45 and on one end side in the direction of the center line E; and a second outer peripheral lip portion 454 located on the outer peripheral side in the radial direction of the elastic member 45 and on the other end side in the direction of the center line E.

The lip portions 451 to 454 in their free states incline toward the center line E as can be seen from the cross sectional view perpendicular to the circumferential direction of the elastic member 45 (as shown by a solid line in FIG. 4). Therefore, when the elastic member 45 is assembled at the predetermined position, bending moment acts on the lip portions 451 to 454 so as to deform them by bending in a direction in which an angle with respect to the center line E changes (as shown by a dotted line in FIG. 4). Moreover, the elastic member 45 has a symmetrical shape between one end side and the other end side in the direction of the center line E.

Figure 5:
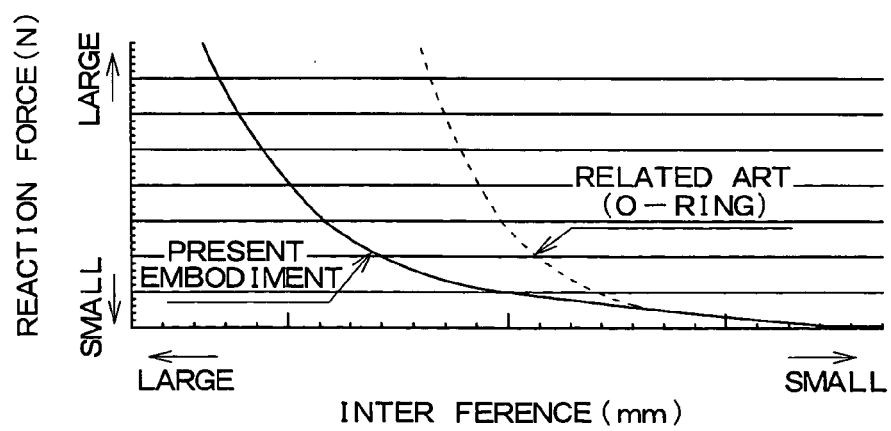
FIG. 5 is a characteristic diagram showing a relation between an interference of the elastic member and reaction force of the elastic member.

FIG. 5 shows a relation between an interference of the elastic member and reaction force thereof. A solid line shows characteristics of the elastic member 45 according to the first embodiment, and a dotted line shows characteristics of a general O-ring. Note that the interference refers to a difference between a dimension of the elastic member in the free state in the direction of the center line, that is a thickness in the free state, and a dimension of the elastic member in the assembly state in the direction of the center line, that is the thickness in the assembly state.

As shown in FIG. 5, in the case of O-ring, reaction force due to compressive deformation is applied. Therefore, the reaction force sharply increases with respect to increase of the interference even in a region where the interference is small. On the other hand, in the case of the elastic member 45 according to the present embodiment, the lip portions 451 to 454 of the elastic member 45 are deformed by bending in the region where the interference is small. Therefore, in the case of the elastic member 45 according to the first embodiment, a rate of increase in the reaction force with respect to a rate of increase in the interference is less than the O-ring which is deformed by compression.

In a state where the pressure increase control valve 3 is sandwiched by the housing 7 and the cover 8, the lip portions 451 to 454 are deformed by bending (as shown by the dotted line in FIG. 4), reaction force thereof urges the spool 41 to the side of the flange portion 432 of the yoke 43. Accordingly, movement of the spool 41 is constrained because the spool 41 is pressed to the flange portion 432 of the yoke 43 and the entire coil portion is urged to the cover 8.

Next, an operation of the pressure increase control valve 3 will be explained with reference to FIGS. 1 and 3. FIG. 3 shows an operational state of the pressure increase control valve 3 when normal braking is applied, that is when current is not applied to the coil. When current is not applied to the coil, the shaft 33 and the plunger 38 are urged to the side of the bottom surface of the sleeve 37 by the spring 39, and the plunger 38 contacts a bottom surface of the sleeve 37. Next, the valve element 331 of the shaft 33 separates from the first valve seat 342 of the seat 34, and the brake conduit A1 is communicated with the brake conduit A2, through the first passage 341 of the seat 34, the space 326 in the guide 32 and the communication hole 327 of the guide 32. Therefore, when normal braking is executed, the brake fluid flows between the master cylinder 1 and the wheel cylinder 2 in accordance with an operation of the brake pedal.

On the other hand, during a pressure is reduced and a pressure is maintained by ABS control, that is, when the pressure increase control valve 3 is closed, current is applied to the coil 40. When current is applied to the coil 40, the coil 40 creates a magnetic field, and the guide 32, the plunger 38, the yoke 43 and the ring member 44 form a magnetic path. Next, the plunger 38 is attracted to a side of the guide 32 by magnetic attraction force, and the shaft 33 and the plunger 38 are moved to the side of the seat 34, resisting the spring 39, whereby the valve element 331 of the shaft 33 abuts with the first valve seat 342 of the seat 34. Accordingly, the pressure increase control valve 3 is closed and flow of the brake fluid from the brake conduit A1 to the brake conduit A2 is cut off.

Next, during a pressure is increased by the ABS control, current application to the coil 40 is stopped and the pressure increase control valve 3 is opened, whereby the brake fluid flows from the brake conduit A1 to the brake conduit A2.

Further, during the pressure is reduced or the pressure is maintained by the ABS control, that is, if depression of the brake pedal is stopped, when the pressure increase control valve 3 is closed, the check valve 31 is separated from the second valve seat 344 of the seat 34 due to a pressure difference between the side of the master cylinder 1 and the side of the wheel cylinder 2. Accordingly, the brake conduit A1 is communicated with the brake conduit A2 through the second communication passage 343 of the seat 34, the space 326 in the guide 32, and the communication hole 327 in the guide 32. Therefore, the brake fluid flows from the side of the wheel cylinder 2 to the side of the master cylinder 1.

As described above, according to the first embodiment, the spool 41 is pressed to the flange portion 432 of the yoke 43 by urging force of the elastic member 45, and the yoke 43 is pressed to the cover 8 through the spool 41. Therefore, it is possible to prevent looseness of both the spool 41 and the yoke 43, thereby suppressing a mechanical load acting on the terminal 42 and the soldered portion 11.

Moreover, according to the first embodiment, since the lip portions 451 to 454 are deformed by bending in a region where the interference is small, rate of increase in reaction force is less than a rate of increase in the interference. Accordingly, even in the case where the interference of the elastic member 45 becomes large, the reaction force of the elastic member 45 does not become excessively large. Therefore, it is possible to reduce the cost and the size of the ABS actuator.

Further, according to the first embodiment, the lip portions 451 to 454 in the free state incline toward the center line E of the elastic member 45. Therefore, when the elastic member 45 is assembled, bending moment acts on the lip portions 451 to 454, whereby the lip portions 451 to 454 are reliably deformed by bending.

Further, according to the first embodiment, the elastic member 45 is symmetric between one end side and the other end side in the direction of the center line E. Therefore, it is possible to prevent an erroneous assembly with an orientation in which the elastic member 45 is assembled.

Note that, according to the first embodiment, the pressure increase control valve 3 is employed as a solenoid valve. However, even when a pressure reduction control valve is used as the solenoid valve, the same effects can be obtained.

(Second Embodiment)

Figure 6:
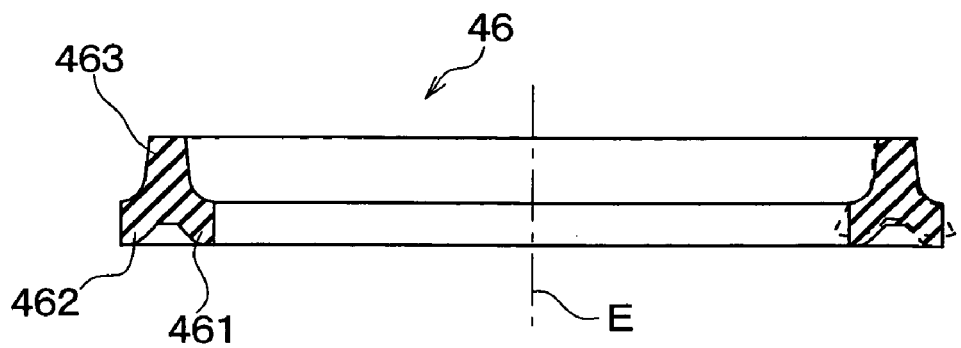
FIG. 6 is a sectional view showing a structure of an elastic member according to a second embodiment.

In the second embodiment, the structure of the elastic member 45 of the first embodiment has been changed. FIG. 6 shows a structure of an elastic member 46 according to the second embodiment. FIG. 6 shows a cross section perpendicular to the circumferential direction of the elastic member 46. A solid line in FIG. 6 shows a shape of the elastic member 46 in the free state, and a dotted line in FIG. 6 shows a state where the elastic member 46 is assembled between the spool 41 and the guide 32 (see FIG. 3).

In FIG. 6, the elastic member 46 is formed of rubber into a ring-like shape, including two lip portions 461 and 462 that can be deformed by bending and a protruding portion 463 that is deformed by bending or deformed by compression. Specifically, the elastic member 46 has an inner peripheral lip portion 461 located on the inner peripheral side in the radial direction of the elastic member 46 and on one end side in the direction of the center line E; an outer peripheral lip portion 462 located on the outer peripheral side in the radial direction of the elastic member 46 and on one end side in the direction of the center line E; and the protruding portion 463 located on the other end side in the direction of the center line E of the elastic member 46 and extending substantially in parallel with the direction of the center line E.

The two lip portions 461 and 462 in their free states incline toward the center line E, as can be seen from the cross sectional view perpendicular to the circumferential direction of the elastic member 46 (as shown by the solid line). Therefore, when the elastic member 46 is assembled at a predetermined position, bending moment acts on the lip portions 461 and 462 so as to deform them by bending in a direction in which an angle with respect to the center line E changes (as shown by the dotted line).

Moreover, according to the second embodiment, the two lip portions 461 and 462 are deformed by bending in a region where the interference is small, a rate of increase in the reaction force is less than a rate of increase in the interference. Accordingly, as with the case with the first embodiment, it is possible to reduce the cost and the size of the ABS actuator.

Further, according to the second embodiment, the lip portions 461 and 462 in the free state incline toward the center line E of the elastic member 46. Therefore, when the elastic member 46 is assembled, bending moment acts on the lip portions 461 and 462, whereby the lip portions 461 and 462 are reliably deformed by bending.

(Third Embodiment)

Figure 7:
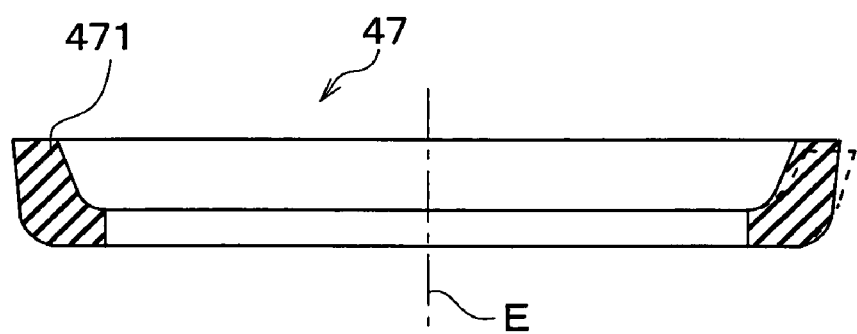
FIG. 7 is a sectional view showing a structure of an elastic member according to a third embodiment.

In the third embodiment, the structure of the elastic member 45 in the first embodiment has been changed. FIG. 7 shows a structure of an elastic member 47 according to the third embodiment. FIG. 7 shows a cross section perpendicular to the circumferential direction of the elastic member 47. A solid line in FIG. 7 shows a shape of the elastic member 47 in the free state, and a dotted line in FIG. 7 shows a state where the elastic member 47 is assembled between the spool 41 and the guide 32 (see FIG. 3).

In FIG. 7, the elastic member 47, formed of rubber into a ring-like shape, has a lip portion 471 which can be bent. The lip portion 471 in the free state inclines toward to the center line E, as can be seen from the cross sectional view perpendicular to the circumferential direction of the elastic member 47 (as shown by the solid line). More specifically, the lip portion 471 expands to the outer peripheral side in the radial direction from one end side to the other end side in the direction of the center line E. Accordingly, when the elastic member 47 is assembled at a predetermined position, bending moment acts on the lip portion 471 so as to deform it by bending in a direction in which an angle with respect to the center line E changes (as shown by the dotted line).

Moreover, according to the third embodiment, the lip portion 471 is deformed by bending in a region where the interference is small, a rate of increase in the reaction force is smaller than a rate of increase in the interference. Accordingly, as with the case with the first embodiment, it is possible to reduce the cost and the size of the ABS actuator.

Further, according to the third embodiment, the lip portion 471 in the free state inclines toward to the center line E of the elastic member 47. Therefore, when the elastic member 47 is assembled, bending moment acts on the lip portion 471, whereby the lip portion 471 is reliably deformed by bending.

(Fourth Embodiment)

Figure 8:
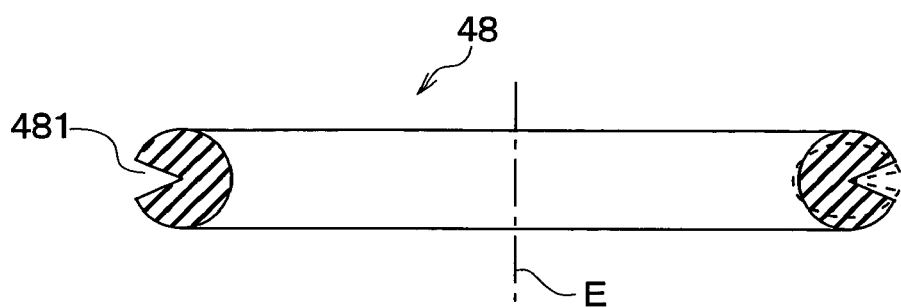
FIG. 8 is a sectional view showing a structure of an elastic member according to a fourth embodiment.

In the fourth embodiment, the structure of the elastic member 45 in the first embodiment has been changed. FIG. 8 shows a structure of an elastic member 48 according to the fourth embodiment. FIG. 8 shows a cross section of the elastic member 48 perpendicular to the circumferential direction of the elastic member 48. A solid line in FIG. 8 shows a shape of the elastic member 48 in the free state, and a dotted line in FIG. 8 shows a state where the elastic member 48 is assembled between the spool 41 and the guide 32 (see FIG. 3).

In FIG. 8, the elastic member 48 is formed of rubber into a ring-like shape. The face when cross sectionally cut, perpendicular to the circumferential direction of the elastic member 48 is a circular one provided with a wedge-shaped cut-out portion 481. The cut-out portion 481 is provided on the outer peripheral side in the radial direction of the elastic member 48. When the elastic member 48 is assembled at a predetermined position, it is deformed by bending such that a space of the cut-out portion 481 is reduced (as shown by the dotted line).

Moreover, according to the fourth embodiment, the elastic member 48 is deformed by bending in a region where the interference is small, a rate of increase in the reaction force is smaller than a rate of increase in the interference. Accordingly, as with the case with the first embodiment, it is possible to reduce the cost and the size of the ABS actuator.

(Fifth Embodiment)

Figure 9:
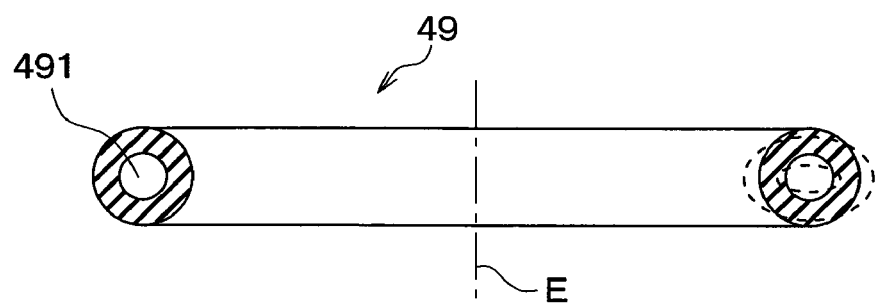
FIG. 9 is a sectional view showing a structure of an elastic member according to a fifth embodiment.

In the fifth embodiment, the structure of the elastic member 45 in the first embodiment has been changed. FIG. 9 shows a structure of an elastic member 49 according to the fifth embodiment. FIG. 9 shows a cross section of the elastic member 49 cut along the plane perpendicular to the circumferential direction of the elastic member 49. A solid line in FIG. 9 shows a shape of the elastic member 49 in the free state, and a dotted line in FIG. 9 shows a state where the elastic member 49 is assembled between the spool 41 and the guide 32 (see FIG. 3).

In FIG. 9, the elastic member 49 is formed of rubber into a ring-like shape. The cross section perpendicular to the circumferential direction of the elastic member 49 is doughnut-shaped having a hollow hole 491 at a center portion of the elastic member 49. When the elastic member 49 is assembled at a predetermined position, it is deformed by bending into an ellipsoid shape as shown by a dotted line in FIG. 9.

According to the fifth embodiment, since the elastic member 49 is deformed by bending in a region where the interference is small, a rate of increase in the reaction force is less than a rate of increase in the interference. Accordingly, as with the case with the first embodiment, it is possible to reduce the cost and the size of the ABS actuator.

While the above description is of the preferred embodiments of the present invention, it should be appreciated that the invention may be modified, altered, or varied without deviating from the scope and fair meaning of the following claims.

What is claimed is:

1. A fluid control apparatus comprising:
   a solenoid valve provided with a coil portion in which a coil for creating a magnetic field when current is applied is housed in a yoke made of a magnetic material;
   a housing in which a fluid passage is formed which is opened and closed by the solenoid valve;
   a cover which sandwiches the solenoid valve between the cover and the housing; and
   an elastic member urging the coil portion toward the cover, wherein
   the elastic member is formed of rubber and shaped so as to be deformed by bending, and is formed into a ring-like shape, and is disposed on an end face on a side of the housing in the coil portion, such that a direction of a center line of the elastic member is in alignment with a direction in which the elastic member urges the coil portion, and the elastic member has a lip portion which can be deformed by bending in a direction in which the lip portion inclines toward the center line of the elastic member.

2. The fluid control apparatus according to claim 1, the elastic member has lip portions which can be deformed by bending in a direction in which the lip portion inclines toward the center line of the elastic member, and are provided on an inner peripheral side and an outer peripheral side in a radial direction of the elastic member.

3. The fluid control apparatus according to claim 2, wherein the lip portions of the elastic member are provided on one end side and the other end side in the direction of the center line of the elastic member.

* * * * *